United States Patent
Quan et al.

(10) Patent No.: US 11,583,808 B2
(45) Date of Patent: Feb. 21, 2023

(54) METHOD OF PREPARATION OF CONDUCTIVE POLYMER/CARBON NANOTUBE COMPOSITE NANOFILTRATION MEMBRANE AND THE USE THEREOF

(71) Applicant: DALIAN UNIVERSITY OF TECHNOLOGY, Liaoning (CN)

(72) Inventors: Xie Quan, Liaoning (CN); Haiguang Zhang, Liaoning (CN); Shuo Chen, Liaoning (CN); Hongtao Yu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 345 days.

(21) Appl. No.: 16/644,050

(22) PCT Filed: Dec. 18, 2018

(86) PCT No.: PCT/CN2018/121758
§ 371 (c)(1),
(2) Date: Mar. 3, 2020

(87) PCT Pub. No.: WO2020/124362
PCT Pub. Date: Jun. 25, 2020

(65) Prior Publication Data
US 2021/0008503 A1    Jan. 14, 2021

(51) Int. Cl.
| | | |
|---|---|---|
| *B01D 67/00* | (2006.01) | |
| *C01B 32/159* | (2017.01) | |
| *C01B 32/166* | (2017.01) | |
| *B01D 69/02* | (2006.01) | |
| *B01D 69/12* | (2006.01) | |
| *B01D 69/14* | (2006.01) | |
| *B01D 71/02* | (2006.01) | |
| *B82Y 30/00* | (2011.01) | |
| *B82Y 40/00* | (2011.01) | |

(52) U.S. Cl.
CPC ..... *B01D 67/0006* (2013.01); *B01D 67/0079* (2013.01); *B01D 69/02* (2013.01); *B01D 69/125* (2013.01); *B01D 69/148* (2013.01); *B01D 71/021* (2013.01); *C01B 32/159* (2017.08); *C01B 32/166* (2017.08); *B01D 2315/08* (2013.01); *B01D 2315/10* (2013.01); *B01D 2323/40* (2013.01); *B01D 2323/50* (2013.01); *B01D 2325/26* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| 5,011,518 A  *  | 4/1991 | Ogawa | B05D 1/185 216/87 |
|---|---|---|---|
| 2006/0062983 A1* | 3/2006 | Irvin, Jr. | B82Y 30/00 428/220 |
| 2018/0043312 A1 | 2/2018 | Endo et al. | |

FOREIGN PATENT DOCUMENTS

| CN | 101791522 A | 8/2010 |
|---|---|---|
| CN | 104211138 A | 12/2014 |
| CN | 104311852 A | 1/2015 |
| WO | WO 2016/158992 A1 | 10/2016 |

OTHER PUBLICATIONS

Mohammad Reza Mahdavi et al, Effect of blending polypyrrole coated multiwalled carbon nanotube on desalination performance and antifouling property of thin film nanocomposite nanofiltration membranes, Separation and Purification Technology, vol. 184, 2017, pp. 119-127 (Year: 2017).*
Ezgi Bayram, Erol Akyilmaz, Development of a new microbial biosensor based on conductive polymer/multiwalled carbon nanotube and its application to paracetamol determination, Sensors and Actuators B: Chemical, vol. 233, 2016, pp. 409-418 (Year: 2016).*
Mahdavi et al., Fabrication and water desalination performance of piperazine-polyamide nanocomposite nanofiltration membranes embedded with raw and oxidized MWCNTs, Journal of the Taiwan Institute of Chemical Engineers, vol. 75, 2017, pp. 189-198 (Year: 2017).*

* cited by examiner

*Primary Examiner* — Jason M Greene
*Assistant Examiner* — Eric J Mccullough
(74) *Attorney, Agent, or Firm* — Muncy, Geissler, Olds & Lowe, P.C.

(57) ABSTRACT

A method for preparation of conductive polymer/carbon nanotube (CNT) composite nanofiltration (NF) membrane and the use thereof. This conductive polymer/CNT composite NF membrane is obtained by polymerizing conductive polymer into a CNT membrane and then in-situ cross-linking with glutaraldehyde under acidic condition. The synthetic method for the conductive polymer/CNT composite NF membrane is simple and has no need of expensive equipment. The prepared membrane has controllable membrane structure and possesses superior electrical conductivity and electrochemical stability. The membrane can couple with electrochemistry for electrically assisted filtration. With the electrical assistance, the membrane can achieve improved ion rejection performance while retaining high permeability by enhancement of membrane surface charge density, which alleviates the permeability-selectivity trade-off. Furthermore, the electrically assisted NF membrane filtration can also enhance the removal for small molecular organic pollutants.

5 Claims, No Drawings

METHOD OF PREPARATION OF CONDUCTIVE POLYMER/CARBON NANOTUBE COMPOSITE NANOFILTRATION MEMBRANE AND THE USE THEREOF

FIELD OF THE INVENTION

The present invention belongs to the field of water treatment technology, and relates to a method for preparation of conductive polymer/carbon nanotube (CNT) composite nanofiltration (NF) membrane and the use thereof.

BACKGROUND OF THE INVENTION

Membrane separation technology has been widely used in the field of water treatment due to its advantages of high separation efficiency, no chemical addition, simple operational process, low energy consumption, easy scale-up and so on. Based on the membrane pore size, the membrane process can be classified into four different types: microfiltration (MF), ultrafiltration (UF), nanofiltration (NF) and reverse osmosis (RO). In particular, NF as a promising membrane separation technology has the membrane pore size range of 0.5-2 nm and can efficiently reject multivalent salt ions and organic molecules above 300 Da, which has great potential in desalination and removal of heavy metal ions and organic pollutants. However, NF membranes are still subject to some limitations. On the one hand, the trade-off between permeability and selectivity is existed for the NF membranes, which is a ubiquitous and pernicious problem and can restrict the membrane separation performance. On the other hand, NF membranes exhibit low rejection rates for monovalent salt ions (e.g., $Cl^-$, $F^-$, $Br^-$, $NO_3^-$, $Na^+$, $K^+$, etc.), generally between 10 and 60%. Such issues make it difficult for NF membranes to meet the growing demands on water quality, which could restrict the application of NF membranes in the field of water treatment. Therefore, it is necessary to improve the selectivity of NF membranes, while retaining high permeability.

According to the separation mechanism of NF membranes, reducing membrane pore size and/or enhancing electrostatic interaction may be effective and available ways to improve the rejection performance of the NF membrane. Owing to the trade-off between permeability and rejection, narrowing the membrane pore size leads to the decline of permeability, which is unfavorable for the overall separation performance. Moreover, enhancing electrostatic interaction between the membrane and charged target species could be another method for improved rejection performance besides the high water permeance. At present, surface modification is attractive for NF membranes to obtain enhanced electrostatic interaction by increasing the surface charge density of the membrane. However, the increase of the surface charge density is restricted by the thin separation layer and the limited effective specific surface area of the membrane. To further improve the electrostatic interaction, other effective strategies should be sought. Recently, electrically assisted membrane separation technologies have been rapidly developed, which can achieve improved membrane adsorption capacity and enhanced membrane surface charge density. Thus, electrically assisted NF may be expected to improve the ion rejection performance of the membrane without reducing the membrane pore size. Furthermore, this strategy may also enhance the removal of small molecular organic pollutants. Therefore, it is of great significance for electrically assisted NF to improve the separation performances of NF membranes and to facilitate their application in the field of water treatment.

SUMMARY OF THE INVENTION

The purposes of the present invention are to overcome the deficiencies of NF membranes in the application for water treatment—that is the permeability-selectivity trade-off and the low rejection especially for monovalent ions. The invention provides a preparation method of a conductive polymer/CNT composite NF membrane. This NF membrane is obtained by polymerizing conductive polymer into a CNT membrane and then in-situ cross-linking with glutaraldehyde (GA) under acidic condition. With the electrical assistance, the membrane can achieve improved rejection performance besides high permeability by enhancement of membrane surface charge density, which alleviates the permeability-selectivity trade-off.

The above conductive polymer/CNT composite NF membrane is prepared by a process comprising the following sequential steps:

(1) Preparation of CNT membrane

CNTs are oxidized in mixed acid solution of 70 wt. % concentrated $HNO_3$ and concentrated $H_2SO_4$ solution (⅓, v/v) at 40~100° C. for 30~120 min. Then the obtained dispersion is diluted with ultrapure water and filtered. The resulting oxidized CNTs are washed and dried. After that, the oxidized CNTs are re-dispersed to form a uniform aqueous dispersion and then vacuum-filtered onto a membrane support to yield CNT membranes. Finally, the prepared CNT membrane is dried at 40~80° C.

(2) The prepared CNT membrane is soaked in a monomer solution of the corresponding conductive polymer for 10~30 min before draining off the excess solution. Afterwards, the CNT membrane is put into an initiator solution for initiating the polymerization of monomer. After polymerizing at 0~25° C. for 5~30 min, the membrane is taken out and continued to react for 4~24 h under 0~25° C. for completing the chemical oxidative polymerization of the monomer.

(3) The CNT membrane is fully immersed into a cross-linker solution prepared by mixing glutaraldehyde and concentrated HCl. After the crosslinking, the membrane is washed well with water and dried at room temperature to obtain the conductive polymer/CNT composite NF membrane.

In step (1), the CNTs are selected from the group consisting of single-walled CNTs, double-walled CNTs and multiwalled CNTs. There is no restriction on the outer diameter of the CNTs, preferably, the outer diameter is selected from 5 to 50 nm.

In step (1), the membrane support is not limited, which should have superior mechanical strength and be suitable for the preparation of NF membranes. Generally, the material of the membrane support is one or more of polyacrylonitrile, polyvinylidene fluoride, non-sulfonated phenolphthalein polyaryl ether sulfone, polyethersulfone, bisphenol-A-polysulfone.

In step (1), the thickness of the CNT membrane is 0.05~0.5 μm.

In step (2), the conductive polymer is selected from polyaniline, polypyrrole, polythiophene and derivatives thereof. The concentration of the conductive polymer is 0.01~0.5 M, preferably 0.1~0.2 M.

In step (2), the monomer solution of the corresponding conductive polymer can be mixed with polyelectrolyte. The polyelectrolyte is selected from the group consisting of polystyrolsulfon acid, polyacrylic acid, polyethyleneimine, poly(allylamine hydrochloride) and poly(diallyldimethylammonium chloride). The mass content of the polyelectrolyte in the solution is 0~5%, preferably 0.5~2%.

In step (2), the initiator is selected from the group consisting of ammonium persulfate, potassium dichromate, potassium iodate, ferric chloride, ferric tetrachloride, hydrogen peroxide, aluminum trichloride, manganese dioxide and benzoyl peroxide. The molar ratio of the initiator to the monomer of the corresponding conductive polymer is 1:0.5~2.

In step (3), the mass percentage of glutaraldehyde in the solution is 0.5~5% and the molar concentration of HCl is 0.1~2 M. The crosslinking time is 10~60 min, preferably 20~30 min.

In step (3), the conductive polymer/CNT composite NF membrane can couple with electrochemistry for electrically assisted filtration, which can achieve enhanced separation performance. The specific method for electrically assisted filtration is as follows: the NF membrane is sealed in a membrane module, in which the membrane as a work electrode combines with the counter electrode to form a two-electrode system. A DC stabilized power supply is used to provide voltage by metallic wires. The membrane module is installed onto a membrane filtration setup for investigating the separation performance of electrically assisted NF membrane.

The counter electrode is selected from the group consisting of titanium sheet, titanium mesh, stainless steel sheet, stainless steel mesh, graphite sheet and carbon fiber cloth. The distance between the work electrode and the counter electrode is 0.1~20 mm, preferably 0.5~10 mm.

The voltage between the work electrode and the counter electrode ranges from 0 to 5 V, preferably 0.5~2.0 V. The membrane electrode can be applied with positive bias or negative bias.

The membrane can be operated in condition of dead-end filtration or cross-flow filtration.

The present invention has the following advantageous effects:

The synthetic method for the conductive polymer/CNT composite NF membrane is simple and has no need of expensive equipment. The prepared membrane has controllable membrane structure and possesses superior electrical conductivity and electrochemical stability. The NF membrane can couple with electrochemistry for electrically assisted filtration, which can achieve improved ion separation performance while retaining high permeability for alleviating the permeability-selectivity trade-off. Furthermore, the electrically assisted NF membrane filtration can also enhance the removal for small molecular organic pollutants.

DETAILED DESCRIPTION

The following describes the specific embodiments of the present invention in combination with technical solutions.

Three specific examples are to further illustrate the present invention in detail, but the scope of the present invention is not limited thereto.

Example 1

(1) CNTs are oxidized in mixed acid solution of 70 wt. % concentrated $HNO_3$ and concentrated $H_2SO_4$ solution (⅓, v/v) at 60° C. for 60 min. Then the obtained dispersion is diluted with ultrapure water and filtered. The resulting oxidized CNTs are washed to neutral pH and dried. After that, the oxidized CNTs are re-dispersed in ultrapure water to form a uniform aqueous dispersion (0.5 mg mL$^{-1}$) with ultrasonication. Then 10 mL CNT dispersion is vacuum-filtered onto a polyvinylidene fluoride membrane support to yield CNT membrane, and the membrane is dried at 60° C. The prepared CNT membrane is soaked in 0.1 M aniline solution with 1.0 wt. % polyacrylic acid for 10 min before draining off the excess solution. Afterwards, the membrane is put into 0.1 M ammonium persulfate solution for initiating the polymerization of aniline. After polymerizing at 4° C. for 10 min, the membrane is taken out and continued to react for 6 h under 4° C. and then dried at room temperature. Finally, the composite membrane is fully immersed into a crosslinker solution containing 1.0 wt. % glutaraldehyde and 0.5 M HCl. After the crosslinking for 30 min, the membrane is washed well with water and dried at room temperature to obtain a polyaniline/CNT composite NF membrane.

(2) The prepared NF membrane is sealed in a membrane module and then installed onto a membrane filtration setup. The membrane serves as the work electrode and a titanium mesh is used as the counter electrode. The distance between the work electrode and the counter electrode is 2 mm. A DC stabilized power supply is used to provide voltage by titanium wires. A feed solution of 5 mM $Na_2SO_4$ is filtered for 30 min at a transmembrane pressure of 2 bar before collecting the permeate sample. Without the electrical assistance, the NF membrane exhibits a permeance of 14.0 Lm$^{-2}$ h$^{-1}$ bar$^{-1}$ and a rejection rate of 81.6% for $Na_2SO_4$. Adjusting the DC stabilized power supply and setting the voltage to 2.5 V (the membrane electrode is applied with negative bias), the electrically assisted NF membrane exhibits a permeance of 13.7 L m$^{-2}$ h$^{-1}$ bar$^{-1}$ and a rejection rate of 93.0% for $Na_2SO_4$ after the pre-filtration for 30 min.

Example 2

(1) CNTs are oxidized in mixed acid solution of 70 wt. % concentrated $HNO_3$ and concentrated $H_2SO_4$ solution (⅓, v/v) at 80° C. for 30 min. Then the obtained dispersion is diluted with ultrapure water and filtered. The resulting oxidized CNTs are washed to neutral pH and dried. After that, the oxidized CNTs are re-dispersed in ultrapure water to form a uniform aqueous dispersion (0.5 mg mL$^{-1}$) with ultrasonication. Then 15 mL CNT dispersion is vacuum-filtered onto a polyethersulfone membrane support to yield CNT membrane, and the membrane is dried at 80° C. The prepared CNT membrane is soaked in 0.15 M pyrrole solution with 1.5 wt. % polyacrylic acid for 20 min before draining off the excess solution. Afterwards, the membrane is put into 0.1 M hydrogen peroxide solution for initiating the polymerization of pyrrole. After polymerizing at 0° C. for 15 min, the membrane is taken out and continued to react for 12 h under 0° C. and then dried at room temperature. Finally, the composite membrane is fully immersed into a crosslinker solution containing 2.0 wt. % glutaraldehyde and 1 M HCl. After the crosslinking for 20 min, the membrane is washed well with water and dried at room temperature to obtain a polypyrrole/CNT composite NF membrane.

(2) The prepared NF membrane is sealed in a membrane module and then installed onto a membrane filtration setup. The membrane serves as the work electrode and a titanium mesh is used as the counter electrode. The distance between the work electrode and the counter electrode is 1 mm. A DC stabilized power supply is used to provide voltage by titanium wires. A feed solution of 5 mM NaCl is filtered for 30 min at a transmembrane pressure of 2 bar before collecting the permeate sample. Without the electrical assistance, the NF membrane exhibits a permeance of 12.4 L m$^{-2}$ h$^{-1}$ bar$^{-1}$ and a rejection rate of 59.6% for NaCl. Adjusting the DC stabilized power supply and setting the voltage to 2.5 V (the membrane electrode is applied with negative bias), the electrically assisted NF membrane exhibits a permeance of 11.2 Lm$^{-2}$ h$^{-1}$ bar$^{-1}$ and a rejection rate of 85.3% for NaCl after the pre-filtration for 30 min.

Example 3

(1) CNTs are oxidized in mixed acid solution of 70 wt. % concentrated HNO$_3$ and concentrated H$_2$SO$_4$ solution (⅓, v/v) at 60° C. for 90 min. Then the dispersion is diluted with ultrapure water and filtered. The resulting oxidized CNTs are washed to neutral pH and dried. After that, the oxidized CNTs are re-dispersed in ultrapure water to form a uniform aqueous dispersion (0.5 mg mL$^{-1}$) with ultrasonication. Then 15 mL CNT dispersion is vacuum-filtered onto a polyethersulfone membrane support to yield CNT membrane, and the membrane is dried at 80° C. The prepared CNT membrane is soaked in 0.15 M 3-methylthiophene solution with 1.5 wt. % poly(allylamine hydrochloride) for 10 min before draining off the excess solution. Afterwards, the membrane is put into 0.2 M ferric chloride solution for initiating the polymerization of 3-methylthiophene. After polymerizing at 20° C. for 30 min, the membrane is taken out and continued to react for 24 h under 20° C. and then dried at room temperature. Finally, the composite membrane is fully immersed into a crosslinker solution containing 2.5 wt. % glutaraldehyde and 1 M HCl. After the crosslinking for 30 min, the membrane is washed well with water and dried at room temperature to obtain a poly(3-methylthiophene)/CNT composite NF membrane.

(2) The prepared NF membrane is sealed in a membrane module and then installed onto a membrane filtration setup. The membrane serves as the work electrode and a titanium mesh is used as the counter electrode. The distance between the work electrode and the counter electrode is 5 mm.

A DC stabilized power supply is used to provide voltage by titanium wires. A feed solution of 10 mg L$^{-1}$ bisphenol A is filtered for 30 min at a transmembrane pressure of 2 bar before collecting the permeate sample. Without the electrical assistance, the NF membrane exhibits a permeance of 8.7 L m$^{-2}$ h$^{-1}$ bar$^{-1}$ and a rejection rate of 48.6% for bisphenol A. Adjusting the DC stabilized power supply and setting the voltage to 2.0 V (the membrane electrode is applied with positive bias), the electrically assisted NF membrane exhibits a permeance of 8.5 Lm$^{-2}$ h$^{-1}$ bar$^{-1}$ and a rejection rate of 98.8% for bisphenol A after the pre-filtration for 30 min.

The foregoing descriptions are merely specific embodiments of the present invention, but the protection scope of the present invention is not limited thereto. Any changes or substitutions within the technical scope disclosed in the present invention, which are readily conceived of by a person skilled in the art, should be covered by the protection scope of the present invention. Therefore, the protection scope of the present invention should be subject to the protection scope of the claims.

The invention claimed is:

1. A method for preparing a conductive polymer/carbon nanotube (CNT) composite nanofiltration (NF) membrane, wherein, the method comprising the following steps:
    (1) CNTs are oxidized in mixed acid solution of 70 wt. % concentrated HNO$_3$ and concentrated H$_2$SO$_4$ solution with 1:3 (v/v) at 40~100° C. for 30~120 min; then the mixed acid solution containing oxidized CNTs is diluted with ultrapure water and filtered; the oxidized CNTs are washed and dried; after that, the oxidized CNTs are re-dispersed to form a uniform aqueous dispersion and then vacuum-filtered onto a membrane support to yield CNT membranes; finally, the prepared CNT membrane is dried at 40~80° C.;
    (2) soaking the prepared CNT membrane in a monomer solution of a corresponding conductive polymer for 10~30 min and before draining off the monomer solution on the CNT membrane; afterwards, the CNT membrane is put into an initiator solution for initiating the polymerization of the monomer of the conductive polymer; after polymerizing at 0~25° C. for 5~30 min, the CNT membrane is taken out and continued to react for 4~24 h under 0~25° C. for completing chemical oxidative polymerization of the monomer of the conductive polymer; wherein the conductive polymer is selected from the group consisting of polyaniline, polypyrrole, polythiophene and derivatives thereof; the concentration of the conductive polymer is 0.01~0.5 M; the initiator is selected from the group consisting of ammonium persulfate, potassium dichromate, potassium iodate, ferric chloride, ferric tetrachloride, hydrogen peroxide, aluminum trichloride, manganese dioxide and benzoyl peroxide; the molar concentration ratio of the initiator to the monomer of the corresponding conductive polymer is 1:0.5~2;
    (3) the CNT membrane obtained from step (2) is fully immersed into a crosslinker solution prepared by mixing glutaraldehyde and concentrated HCl; after crosslinking for 10~60 min, the CNT membrane is washed well with water and dried at room temperature to obtain the conductive polymer/CNT composite NF membrane; wherein the mass percentage of glutaraldehyde in the solution is 0.5~5% and the molar concentration of HCl is 0.1~2 M.

2. The preparation method according to claim 1, wherein, the monomer solution of the corresponding conductive polymer is mixed with polyelectrolyte;
    the polyelectrolyte is selected from the group consisting of polystyrolsulfon acid, polyacrylic acid, polyethyleneimine, poly(allylamine hydrochloride) and poly(diallyldimethylammonium chloride); the mass content of the polyelectrolyte in the solution is 0~5%.

3. The preparation method according to claim 1, wherein, the CNTs are selected from the group consisting of single-walled CNTs, double-walled CNTs and multiwalled CNTs.

4. The preparation method according to claim 1, wherein, the membrane support used to form the CNT membrane in step (1) is made of one or more of polyacrylonitrile, polyvinylidene fluoride, non-sulfonated phenolphthalein polyaryl ether sulfone, polyethersulfone, bisphenol-A-polysulfone; the thickness of the CNT membrane is 0.05~0.5 μm.

5. The preparation method according to claim 3, wherein, the membrane support used to form the CNT membrane in step (1) is made of one or more of polyacrylonitrile, polyvinylidene fluoride, non-sulfonated phenolphthalein polyaryl ether sulfone, polyethersulfone, bisphenol-A-polysulfone; the thickness of the CNT membrane is 0.05~0.5 μm.

* * * * *